US011790108B2

(12) United States Patent
Cook

(10) Patent No.: US 11,790,108 B2
(45) Date of Patent: Oct. 17, 2023

(54) PRIVACY POLICY RATING SYSTEM

(71) Applicant: Early Warning Services, LLC, Scottsdale, AZ (US)

(72) Inventor: Michael Cook, Wimberley, TX (US)

(73) Assignee: Early Warning Services, LLC

( * ) Notice: Subject to any disclaimer, the term of this patent is extended or adjusted under 35 U.S.C. 154(b) by 720 days.

(21) Appl. No.: 16/932,568

(22) Filed: Jul. 17, 2020

(65) Prior Publication Data

US 2020/0349280 A1     Nov. 5, 2020

Related U.S. Application Data

(63) Continuation of application No. 14/565,317, filed on Dec. 9, 2014, now Pat. No. 10,747,897.

(51) Int. Cl.
*G06F 21/62* (2013.01)
*H04L 9/40* (2022.01)
*G06F 16/951* (2019.01)

(52) U.S. Cl.
CPC .......... *G06F 21/6245* (2013.01); *H04L 63/04* (2013.01); *H04L 63/1483* (2013.01); *H04L 63/20* (2013.01); *G06F 16/951* (2019.01)

(58) Field of Classification Search
CPC . H04L 63/20; H04L 63/1483; H04L 63/1416; H04L 63/00; G06F 21/6245; G06F 21/604; G06F 21/53; G06F 16/951
See application file for complete search history.

(56) References Cited

U.S. PATENT DOCUMENTS

| | | | |
|---|---|---|---|
| 7,304,982 B2 | 12/2007 | Hondo et al. | |
| 7,353,532 B2 | 4/2008 | Duri et al. | |
| 7,401,233 B2 | 7/2008 | Duri et al. | |
| 7,401,352 B2 | 7/2008 | Duri et al. | |
| 7,818,588 B2 | 10/2010 | Duri et al. | |
| 7,847,694 B2 | 12/2010 | Lee et al. | |
| 7,877,494 B2 | 1/2011 | Carlton et al. | |
| 7,903,656 B2 | 3/2011 | Hondo et al. | |
| 8,327,451 B2 | 12/2012 | Duri et al. | |
| 8,332,908 B2 | 12/2012 | Hatakeyama et al. | |
| 10,181,043 B1 * | 1/2019 | Pauley, Jr. .............. | H04L 63/20 |
| 10,747,897 B2 | 8/2020 | Cook | |
| 2005/0240580 A1 | 10/2005 | Zamir et al. | |
| 2006/0253583 A1 | 11/2006 | Dixon et al. | |
| 2009/0320090 A1 | 12/2009 | Hungerford et al. | |
| 2012/0017281 A1 | 1/2012 | Banerjee et al. | |
| 2013/0124420 A1 | 5/2013 | Duri et al. | |
| 2014/0130165 A1 | 5/2014 | Patel et al. | |
| 2014/0196152 A1 | 7/2014 | Ur et al. | |
| 2014/0282917 A1 | 9/2014 | Peckover | |
| 2014/0283055 A1 | 9/2014 | Zahran | |
| 2015/0207819 A1 | 7/2015 | Sartor | |

OTHER PUBLICATIONS

"URLs 101: What is a URL?", CITES (Campus Information Technologies and Educational Services), Jun. 14, 2013, 2 pages.

* cited by examiner

*Primary Examiner* — Christopher C Harris
(74) *Attorney, Agent, or Firm* — KILPATRICK TOWNSEND & STOCKTON LLP

(57) ABSTRACT

A system includes a processor and a memory accessible to the processor. The memory stores instructions that, when executed by the processor, cause the processor to determine a privacy policy score for one of an application and a website and provide the privacy policy score to a device.

20 Claims, 10 Drawing Sheets

Privacy Policy Rating Site

This site can be accessed by a user to determine a privacy policy score for a particular web site. Enter the URL below, and we'll determine the privacy policy score for the site.

www.securewebsite.com

Privacy Policy Score: 100 out of 100

This rating indicates a highest possible privacy score, which reflects that no tracking data is collected or personal data shared from this site.

Privacy Policy Site

This site can be accessed by a user to specify the user's preferences with respect to his or her privacy. The data may be used to provide a customized privacy score for each website based on the user's specified preferences.

User Information Collection | Cookies and Tracking | Data Sharing | Review

Some websites request user information, such as the user's name, address, email, phone number, other information, or any combination thereof. Use the input elements below to rate your privacy concerns with respect to each type of information.

| Information Item | Privacy Concern (scale of 1 (lowest) to 5 (highest) |
|---|---|
| First Name | 1 ▼ |
| Last Name | 1 ▼ |
| Full Name | 1 ▼ |
| Address | 1 ▼ |
| Phone | 1 ▼ |
| Occupation | 1 ▼ |
| Salary Range | 1 ▼ |

*FIG. 10*

PRIVACY POLICY RATING SYSTEM

CROSS-REFERENCE TO RELATED APPLICATIONS

This application is a continuation of U.S. patent application Ser. No. 14/565,317, filed Dec. 9, 2014, the entire disclosure of which is hereby incorporated by reference, for all purposes, as if fully set forth herein.

FIELD

This disclosure generally relates to privacy policies, and more particularly to systems and methods of scoring privacy policies.

BACKGROUND

Privacy policies are statements (or sometimes legal documents that comply with privacy laws) that may disclose how the owner of the privacy policy collects, uses, and manages or shares data. In some instances, privacy policies and their contents may be partially determined by applicable statutes, and many companies publish their privacy policies to their websites.

When a user visits a website or a service provider, data pertaining to the user may be collected. The data can include browsing history data, shopping history data, geographic location data, personal data (such as name, address, phone number, etc.), other data, or any combination thereof. Such data and its subsequent use may be governed by the privacy policy of the website.

SUMMARY

In some embodiments, system may include a processor and a memory accessible to the processor. The memory stores instructions that, when executed by the processor, may cause the processor to determine a privacy policy score for one of an application and a website and provide the privacy policy score to a device.

In other embodiments, a method may include determining a privacy policy score for a privacy policy associated with at least one of a website and an application. The method may further include providing the privacy policy score to a device.

In still other embodiments, a memory device may include instructions that, when executed, cause a processor to determine a privacy policy score corresponding to one of a website and an application. The memory device may further include instructions that, when executed, cause the processor to provide the privacy policy score to a device.

BRIEF DESCRIPTION OF THE DRAWINGS

FIG. 9 is a diagram of a graphical user interface to request a privacy policy rating according to some embodiments.

FIG. 10 is a diagram of a graphical user interface accessible by a user to configure user preferences related to privacy policies according to some embodiments.

In the following discussion, the same reference numbers are used in the various embodiments to indicate the same or similar elements.

DETAILED DESCRIPTION

In the following detailed description of embodiments, reference is made to the accompanying drawings which form a part hereof, and which are shown by way of illustrations. It is to be understood that features of various described embodiments may be combined, other embodiments may be utilized, and structural changes may be made without departing from the scope of the present disclosure. It is also to be understood that features of the various embodiments and examples herein can be combined, exchanged, or removed without departing from the scope of the present disclosure.

In accordance with various embodiments, the methods and functions described herein may be implemented as one or more software programs running on a computer processor or controller, or on a computing device, such as a tablet computer, a smart phone, a personal computer, a server, or another computing device. Dedicated hardware implementations including, but not limited to, application specific integrated circuits, programmable logic arrays, and other hardware devices can likewise be constructed to implement the methods and functions described herein. Further, the methods described herein may be implemented as a device, such as a computer readable storage medium or memory device, including instructions that, when executed, cause a processor to perform the methods.

Embodiments of systems, apparatuses, and methods are described below that include a privacy policy analysis system that may be configured to determine a privacy policy score for a particular application or a particular website and to provide the privacy policy score to a device. As used herein, the term "privacy policy" refers to a statement that discloses how an entity collects, uses, discloses and manages collected data. A "privacy policy score" may be a numeric score, a letter grade, or other indicator that may be assigned to a particular website or application based on a semantic analysis of the text of the privacy policy. The privacy policy score may represent a valuation of the quality of the privacy policy with respect to ensuring that information collected about the consumer is protected. In some embodiments, the system may determine the privacy policy in response to a request from a device. The request may be entered by a user into fields of a graphical user interface via a device or may be sent from an application or plugin executing on the device.

Figure 1:
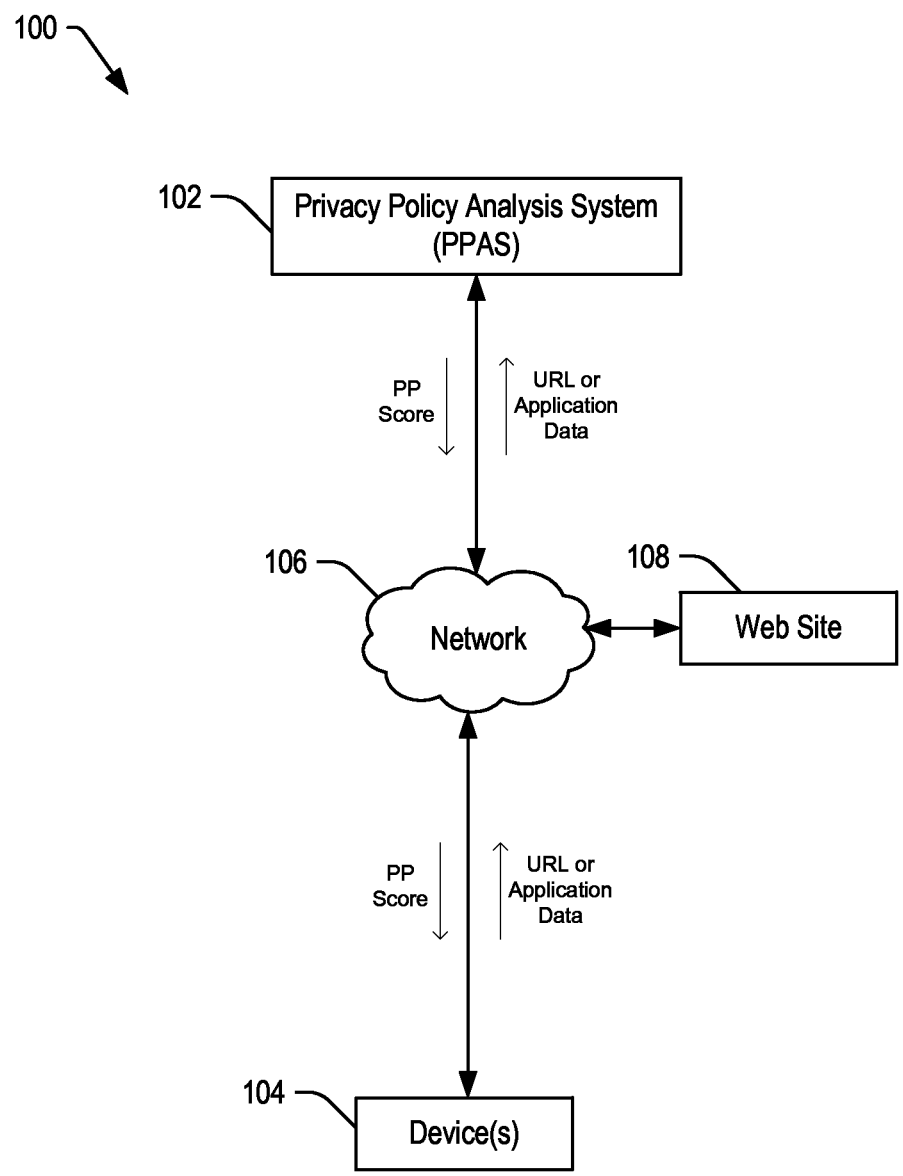
FIG. 1 is a block diagram of a system configured to provide a privacy policy rating according to some embodiments.

Referring now to FIG. 1, a block diagram of a system configured to provide a privacy policy score is depicted and generally designated 100. The system 100 may include a privacy policy analysis system (PPAS) 102, which may communicate with one or more devices 104 via a network 106. The PPAS 102 may also communicate with one or more websites 108 through the network 106. In some embodiments, the one or more devices 104 may include a desktop computer, a laptop computer, a tablet computer, a smart phone, another Internet-enabled communication device, or any combination thereof. In some embodiments, the network 106 may include the Internet, a public switched telephone network, a digital or cellular network, other networks, or any combination thereof.

In some embodiments, the PPAS 102 may receive data from the device 104 and may provide a privacy policy score to the device 104 in response to the data. The device 104 may be configured to display the privacy policy score on a display, such as within an Internet browser window. In some embodiments, the privacy policy score may be presented as a number within an explicit range (e.g., 0, . . . , 100) or a grade, such as a letter grade (e.g., A+, A, A−, B+, B, B−, . . . , D−, F). Thus, the privacy policy score may provide a visual indicator that allows consumers to quickly assess privacy risks associated with a particular website or application. The privacy policy score may reflect the strengths, limitations, and weaknesses of a website's or an application's data management policies; the clarity (or lack of clarity) of a website or an application's privacy policy; the amount of identifying information collected by the company, website, or application; the type of Internet behavior that is captured by a website or application; and the restrictions placed on the collector's use of the data.

In some embodiments, the device 104 may include a privacy policy application or a privacy policy plugin, which may communicate data to the PPAS 102. In some embodiments, the device 104 may execute a browser application, which may include the privacy policy plugin. In response to selection of a website address (i.e., a uniform resource locator (URL)), the privacy policy plugin may send the URL to the PPAS 102 through the network 106 and, in response to sending the URL, the privacy policy plugin may receive the privacy policy score and may display the privacy policy score within the browser window.

In some embodiments, the device 104 may execute a privacy policy application. The privacy policy application may provide an interface to receive data, such as a URL, a name of an application, a name of a company, other input, or any combination thereof. The privacy policy application may transmit the data to the PPAS 102. In response to sending the data, the privacy policy application may receive a privacy policy score corresponding to the data and may display the privacy policy score.

In some embodiments, the PPAS 102 may operate as a proxy server for the device 104, such that the browser application accesses websites via the PPAS 102. In such an example, the PPAS 102 may intercept URL data, determine the privacy policy score for the URL, and may return the website data corresponding to the URL data and the privacy policy score to the device.

In some embodiments, the application or plugin operating on the device 104 or the PPAS 102 acting as the proxy server may prevent access to a website when the privacy policy score falls below a threshold level. In some embodiments, the threshold level may be defined by the user via the device.

Figure 2:
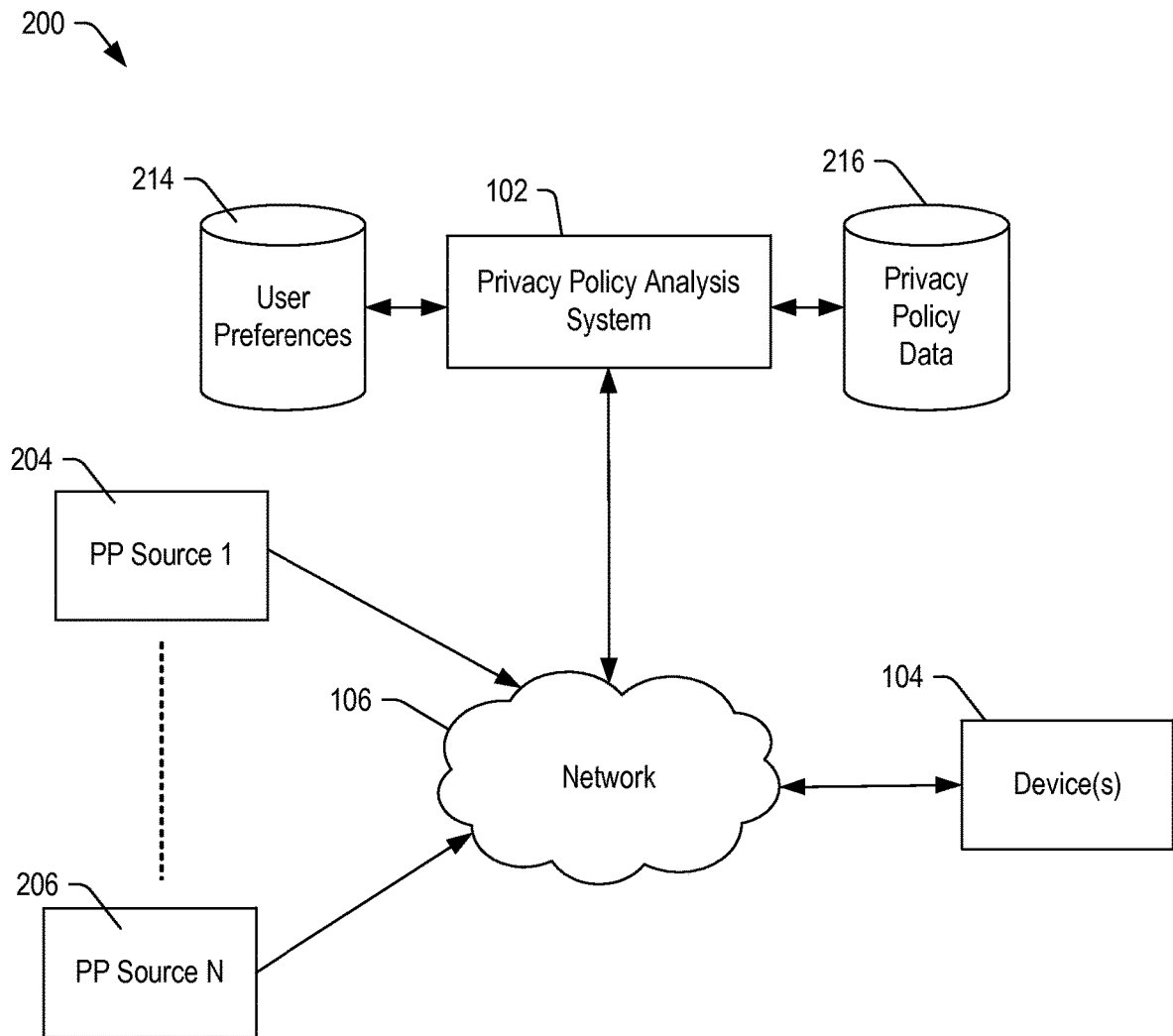
FIG. 2 is a block diagram of a system configured to provide a privacy policy rating according to some embodiments.

Referring to FIG. 2, a block diagram of a system configured to provide privacy policy scores is shown and is generally designated 200. The system 200 includes the privacy policy analysis system (PPAS) 102, which may be configured to communicate with privacy policy sources 204 and 206 and with one or more devices 104 through the network 106. The PPAS 102 may also be coupled to one or more data sources, such as a user preferences database 214 and a privacy policy data database 116. The user preferences database 214 may store preferences regarding each user and their privacy policy preferences. The privacy policy data database 216 may store pre-processed privacy policy data, associated privacy policy scores, and associated website address (uniform resource locator (URL)) data, other data, or any combination thereof. In some embodiments, the user preferences database 114 and the privacy policy database 116 may be combined or included within the PPAS 102, or any combination thereof.

In some embodiments, the privacy policy sources 204 and 206 may include entities that publish their privacy policies online, such as credit card companies, health care providers, banks, businesses, other entities that collect user data, or any combination thereof. Though only two privacy policy sources 204 and 206 are shown in FIG. 2, it should be appreciated that the PPAS 102 may communicate with more than two privacy policy sources.

In some embodiments, the PPAS 102 may receive a privacy policy and may process the privacy policy to determine a privacy policy score for the privacy policy. The privacy policy score, the processed text of the privacy policy, the source address of the privacy policy, other data, or any combination thereof may be stored in the privacy policy database 216. In some embodiments, the privacy policy score may be provided to a device 104.

In some embodiments, the PPAS 102 may retrieve privacy policies (i.e., the text of the privacy policies) from websites automatically using an Internet bot, also known as web robot, which is a software application that runs automated tasks over the Internet. Such bots may fetch privacy policy text and the associated uniform resource locator (URL) data from various websites and may provide the fetched data to the PPAS 102. In some embodiments, a browser plugin on a user's computer may transmit a URL to the PPAS 102, and the PPAS 102 may retrieve a privacy policy associated with the URL in response to receiving the URL. In some embodiments, a user may request a privacy policy score for a website by visiting a privacy policy score web page, which may send the requested URL to the PPAS 102, and the PPAS 102 may retrieve the privacy policy in response to the request.

Upon receipt of the privacy policy, the PPAS 102 may store the text and the associated source information (e.g., URL) in the privacy policy database 116. The PPAS 102 can process the privacy policy data to generate a privacy policy score. In some embodiments, the PPAS 102 may perform a semantic analysis on the privacy policy to determine the "meaning" of various terms. The PPAS 102 may score various aspects of the privacy policy separately and may determine an overall privacy policy score based on the scores of the various aspects. In some embodiments, the PPAS 102 may identify specific elements or aspects that are common to privacy policies and may analyze the language used in each of the specific elements, separately, to determine scores for each element. Subsequently, the PPAS 102 may combine or interpolate the scores to determine an overall privacy policy score for the privacy policy.

In some embodiments, the PPAS 102 may determine the privacy policy score by comparing at least some of the terms to pre-scored text in order to score the various terms automatically. The PPAS 102 may determine the privacy policy score based on ambiguities as well as stated policy limitations and acknowledged data sharing activities to produce the privacy policy score. In some embodiments, the PPAS 102 may process the privacy policy against a set of rules to identify potentially ambiguous statements or weak statements, and may assign a preliminary score to the privacy policy.

In some embodiments, in addition to or in parallel with the automatic privacy policy scoring, the PPAS 102 may utilize human operators to identify ambiguous terms and terminology and to provide an initial privacy policy score to a selected privacy policy based on a scoring index. In some embodiments, the PPAS 102 may semantically process the privacy policy to produce a preliminary score, which may be provided to an operator for review and adjustment. In some embodiments, the PPAS 102 may process the privacy policy data into a template and provide the template to an operator for review and scoring (i.e., generation of the privacy policy score). In some embodiments, the PPAS 102 may include a learning algorithm or artificial intelligence engine that may process and analyze privacy policies and their associated scores, over time, as a training set. Once trained, the learning algorithm or artificial intelligence engine of the PPAS 102 may be used to automatically score privacy policies.

In some embodiments, the PPAS 102 may provide the score to a code snippet of a website for display on the website. In some embodiments, the PPAS 102 may provide the score to an application or a browser plugin operating on a device, such as the device 104. In some embodiments, the PPAS 102 may publish the score to a web page or other document or may provide an electronic signal indicating the privacy policy score to a device, such as the device 104.

In some embodiments, the PPAS 102 may be configured to interact with a code snippet embedded in a web page. The code snippet may cause the web page to retrieve the privacy policy score from the PPAS 102 and to display the score on the webpage within the user's Internet browser. In some embodiments, the PPAS 102 may receive a signal corresponding to the code snippet from a device, which signal may be generated by an application attempting to load the web page. In response to the signal, the PPAS 102 may retrieve the privacy policy score associated with the website from the privacy policy database 216 and may return the privacy policy score to the requesting device. The privacy policy score may be displayed on the webpage.

In some embodiments, the user may click on the score or within a window, popup, or other element configured to display the score. By clicking or otherwise selecting the score, the user may be provided an explanation, providing further insight into the basis for the score so that the user may quickly make an informed decision about whether to continue to view the website. The explanation may be presented via a webpage, a popup, another interface, or any combination thereof. In some embodiments, the informational website or popup may provide alternative links to websites that have better privacy scores than the site being visited and that include the same or similar information (or products), allowing the user to choose to visit alternative sites that have better privacy policies (according to the privacy policy scores).

It should be appreciated that privacy policies may change over time, and that such changes may be relevant to the privacy policy score. The PPAS 102 may be configured to detect a change to a previously scored privacy policy and, in response to detecting the change, the PPAS 102 may initiate a score update process. In some embodiments, the score update process may include determining a change, processing the changed text to determining an adjusted score based on the changed text, and determining an adjusted privacy policy score for the privacy policy based on the adjusted score. In some embodiments, the PPAS 102 may retrieve the privacy policy from the website, may verify the privacy policy against the stored privacy policy to detect any changes, and may return the privacy policy score to the device when no changes are detected. If a change is detected, the PPAS 102 may analyze the change or provide an indication of the change to an operator, determine an adjusted privacy policy score, and send the adjusted privacy policy score to the device.

In some embodiments, the PPAS 102 may determine the privacy policy score based, not only on semantic analysis, pre-determined scores, and rules, but also based on what a user finds to be important in privacy policies. In some embodiments, during a registration process, the PPAS 102 may provide a graphical user interface to a device, through which a user may specify user preferences indicating what the user considers important, such as a relative importance of various aspects of a particular privacy policy or of privacy policies in general, which user preferences may be stored in the user preferences database 214. The PPAS 102 may determine a privacy policy score for a particular site based on the language of the privacy policy, and then may customize the privacy policy score based on user preferences. The request for the privacy policy score may be sent by a device associated with the user and the request may include an identifier associated with the user, which identifier can be used to retrieve the user preferences for that user from the user preferences database 214.

In some embodiments, the user preferences 214 may include inputs from a representative sampling of users. The users may visit a website to rate the importance of various elements of a privacy policy, such as a data collector's gathering of identity information (e.g. name, date of birth, location, address, social security number, etc.), the data collector's Internet behavior (e.g., assigning cookies, tracking usage, data collection, click through, etc.), the data collector's data usage (e.g. internal use only, sell to third parties, prevent fraud, etc.), the data collector's ambiguous or unclear statements (e.g. 'may not follow the policies posted in the privacy policy'), the data collector's opt-out restrictions (opt-out of any data use, opt-out of some data use, opt-out is not permitted at all), other elements, or any combination thereof. For example, the survey may prompt the user through a series of questions designed to determine relative importance of various privacy considerations. (e.g. "Is the collection of click through data more objectionable than the use of cookies?" Yes or no.). In some embodiments, the graphical user interface may include input elements through which a user may enter additional information that can be used to evaluate and score a privacy policy. In some embodiments, the PPAS 102 may average or otherwise algebraically combine the user ratings from a plurality of users to produce a weighting factor for various aspects of privacy policies. The weighting factor may be used to influence the overall privacy policy score for a selected privacy policy.

Figure 3:
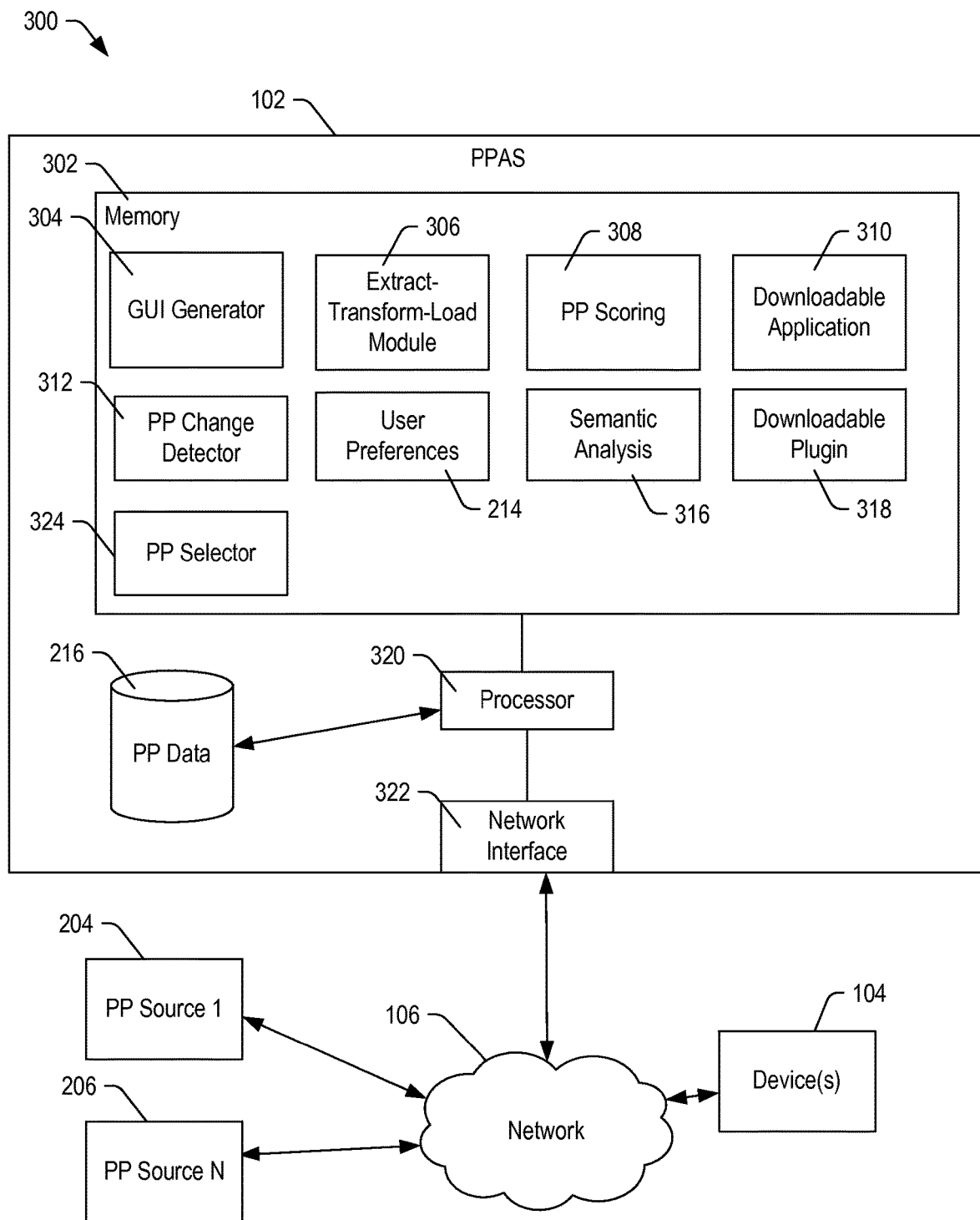
FIG. 3 is a block diagram of a system configured to provide a privacy policy rating according to some embodiments.

Referring now to FIG. 3, a block diagram of a system configured to rate privacy policies is shown and is generally designated 300. The system 300 can be an embodiment of the system 100 in FIG. 1, and the system 200 in FIG. 2. The system 300 may include the PPAS 102, which may include a processor 320 and a memory 302 accessible to the processor 320. The PPAS 102 may also include a network interface 322 that may be coupled to the processor 302 and that may be configured to communicate with the network 106. The memory 302 may include a graphical user interface (GUI) generator module 304 that, when executed, may cause the processor 320 to generate a GUI including user selectable elements. The memory 302 may further include an extract-transform-load module 306 that, when executed, may cause the processor 320 to extract data from a received document, stream or other data source, to transform the extracted data into a suitable format, and to load the extracted and transformed data into a table for further data processing.

The memory 302 may further include a privacy policy scoring module 308 that, when executed, causes the processor 320 to analyze the data in the table or to analyze a privacy policy. In some embodiments, the privacy policy scoring module 308 may cause the processor 320 to compare portions of the privacy policy data against pre-scored text to determine a score for each portion of the privacy policy, to provide portions to a human operator for scoring, or any combination thereof. In some embodiments, the privacy policy scoring module 308 may cause the processor 320 to activate a semantic analyzer 316, which may be configured to process the privacy policy semantically to determine meaning of terms within privacy policies, including limitations on data collection and data use and data sharing rules as well as ambiguous statements. The PP scoring module 308 may determine a privacy policy score for the privacy policy based on data from the semantic analyzer 316.

The memory 302 may also include a downloadable application 310 and a downloadable plugin 318, either of which may be downloaded to a device, such as device 104, through the network 106. In some embodiments, the PPAS 102 may provide the downloadable plugin 318 or the downloadable application 310 to the device 104 through the network 106. The memory 302 may further include a privacy policy change detector 312 that, when executed, may cause the processor 320 to compare text of a privacy policy to a stored version of the privacy policy to detect one or more changes. The memory 302 may also include a privacy policy selector 324 that, when executed, may cause the processor 320 to select a privacy policy for analysis from a plurality of privacy policies stored in memory 302 or in the privacy policy database 216.

In some embodiments, the privacy policy scoring module 308 may analyze a privacy policy based on a list of attributes or characteristics previously determined from manual or automated analysis of existing privacy policies. The privacy policy, a source location (e.g., a URL), its privacy policy score, other data, or any combination thereof may be stored in the privacy policy database 216.

In some embodiments, the PPAS 102 may develop the privacy policy score using a scoring process that may begin by identifying specific elements typical to privacy policies of websites and applications. Such "typical" elements may include elements related to data collection (e.g., types of data collected, how such data is collected, and so on), data retention (e.g., how such data is stored, how such data is secured, etc.), data use (e.g., how the collector of such data uses the collected data, such as internal use, affiliate uses, non-affiliate uses, as well as for what purposes the data may be used, such as marketing, compliance, credit or fraud risk or other uses, etc.), and data sharing (e.g., how and with whom such data is shared). In some embodiments, the "typical" elements may further include privacy policy applicability statements, such as when and under what circumstances the privacy policy may apply or may be disregarded by the data collector.

Once the various elements are identified, the PPAS 102 may apply semantic analysis to the text of such elements. The semantic analysis may identify weak statements, ambiguous statements, etc., and may optionally compare text from the privacy policy to pre-scored text elements in order to determine a numeric value corresponding to those specific elements. The numeric values for the presence (or absence) of those elements and the specific phrasing used in the privacy policy provisions can be used to determine the score for a particular privacy policy.

The privacy policy score can be provided in the form of a numeric score, a five star score system, a letter-based grading system, such as A+, A, A−, B+, B, B−, . . . , D−, F, another scoring system that can be readily understood by consumers, or any combination thereof. In some embodiments, the privacy score may include multiple scores, which may be separately labeled with respect to the various elements, such that a data collection element may receive a first score and a data use element may receive a second score. The PPAS 102 may provide multiple scores, one for each element, and an overall score for the privacy policy as a whole.

In some embodiments, the privacy policy scores can be developed by manually reviewing privacy policies on company websites and associated with applications and scoring the types of elements outlined above. In such embodiments, the raw data from the manual reviews may be stored in a privacy policy database 216, which may include: the variables with their corresponding values (name=yes, SSN=no, location tracking=yes, number of ambiguous statements=7, etc.); the wording of any statements considered to be ambiguous or unclear; the uniform resource locator (URL) to the privacy policy at the privacy policy source; the name of the company and the location information (if available); and the privacy policy in its entirety. To ensure that the privacy policy scores are accurate and up-to-date, in some embodiments, the PPAS 102 can periodically (i.e., daily, weekly or monthly) check the privacy policy by retrieving the privacy policy text from its URL and can compare the retrieved text to that stored in the privacy policy database 216. The PPAS 102 may generate an alert in response to any privacy policies that have changed or in response to any URLs that do not return a current privacy policy to compare. The alert may flag a particular privacy policy to be re-scored or may put the privacy policy into a review queue for manual or automatic review.

In some embodiments, the PPAS 102 may provide a GUI including one or more user-selectable elements that may be accessed by a user to configure user preferences for the user. The PPAS 102 may also collect preferences based on consumer surveys. For example, consumers can rank privacy policy characteristics in order of importance. In some embodiments, consumers may interact with the GUI to rank a privacy policy source's collection of identity data, behavior tracking, data gathering practice, op-out policy, or other characteristics in order of importance. Consumer surveys may be conducted periodically, and characteristics or characteristic variables of the privacy policies may be added or removed. Results of such user inputs may be stored as user preferences 214.

In a particular example, a survey may ask the following information about the individual completing the survey: 1) gender; 2) Year of Birth; 3) Country; and 4) Zip/Post code. The survey may then ask the user to rate on a scale (such as a scale of 1 to 5 with 5 being the most) how much the user cares about privacy and data sharing. With respect to gathering of identity information, the survey may ask the user to rate the importance of privacy with respect to specific identity information, such as the name; physical address; social security number, data of birth, email address, phone numbers, occupation, salary range, etc. Further, the survey may ask the user to rate the importance of privacy with respect to Internet behavior data and website use monitoring, which may be determined through cookies, click through data, etc.

Next, the survey may ask the user about gathering of location data and may include statements, such as the following statements, from which the user may select the one that most closely represents his or her feelings about privacy: 1) "I understand why some sites want my location and am ok with them knowing where I am"; 2) "I think websites and apps should always be able to get information located to my whereabouts"; and 3) "I don't think any website or app should know where I am located regardless of what the site does". The survey may also ask the user to rate the relative undesirability of the following data use practices (worst to least worst): 1) "Use your data internally for the sole purpose of the company to which you provided your data"; 2) "Provide your data to affiliates for their internal use"; 3) "Sell your data to unaffiliated third parties"; and 4) "Sell your data to resellers who sell to other companies." Further, the survey may ask the user to select the worst data use practice from the following list: 1) "To measure you for credit risk"; 2) "To help stop fraud happen to you"; 3) "To help companies comply with federal or state legislation (laws)"; and 4) "To help companies provide you with goods or services you may want." The survey may further inquire about unclear and ambiguous policy statements by asking the user to rate common privacy policy statements that have been determined to be unclear or possibly misleading. One example of such an unclear or possibly misleading statement is "We may not follow our privacy policies with respect to some data."

The survey may also ask the user about the restrictiveness of the opt-out provisions within the privacy policy, such as by asking the user to rate the following statements: 1) "A company allows you to opt out of any use of your data;" 2) "A company allows you to opt out of some types of data use, but not all;" 3) "A company allows you to opt out of use on an individual basis (use by use);" and 4) "A company does not allow you to opt out of use." The survey may also ask the user about his or her privacy concerns with respect to various statements, such as: 1) "The data that a company collects on my identity (name, address, SSN, email, phone #);" 2) "The internet behavior data that a company collects on me (cookies, click through, etc.);" 3) "The way a company gathers information and tracks my location;" 4) "The way that a company provides or sells data on me (internal use, affiliate use, 3rd parties, resellers);" 5) "The way that a company restricts my ability to opt out of use of my data (full opt out, no opt out, some opt out);" 6) "Companies that have unclear or ambiguous language in their privacy policy;" and 7) "The way that a company uses data on me (credit risk, fraud authentication, compliance, marketing). The results of the survey may be used to determine the relative importance of various aspects of the privacy policies for a particular consumer, and the relative importance may be used to determine a customized privacy policy score for the particular user. In some embodiments, the user inputs from a plurality of users may be used to determine a privacy policy score for the privacy policy.

In some embodiments, the privacy policy scoring module 308 may utilize weights derived from survey information about specific characteristics of existing privacy policies from a plurality of users. The privacy policy scoring module 308 may determine which aspects of a privacy policy are most import, least important, etc. The privacy policy scoring module 308 may utilize user preferences and weights provided by the survey information to produce the privacy policy score or to customize the privacy policy score prior to providing the score to the device 104. In some embodiments, the privacy policy scoring module 308 can include instructions that, when executed, cause the processor 320 to analyze the privacy policy based on the consumer surveys to produce a privacy policy data score.

In some embodiments, the GUI generator 304 can include instructions that, when executed, causes the processor 320 to generate a user interface including user-selectable elements accessible by a user to sign up (register) for the privacy policy service, to configure user preferences, and optionally to review privacy policy scores of one or more applications or websites. Consumers interested in signing up for the privacy policy scoring service, or users wanting to renew their membership may do so via the website, web application, telephone, other electronic signup, physical signup, or other method.

Figure 4:
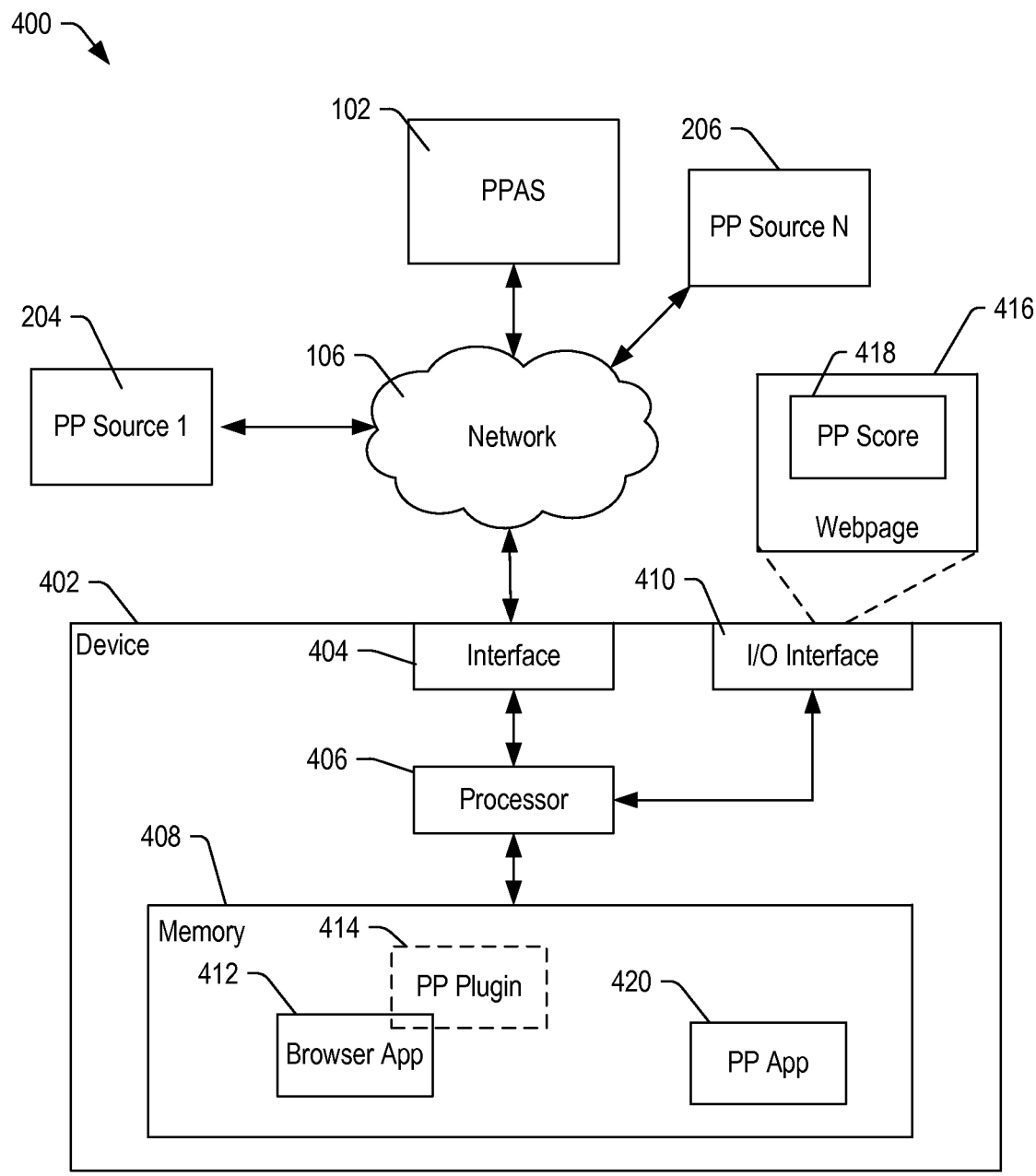
FIG. 4 is a block diagram of a system configured to rate privacy policies according to some embodiments.

Referring to FIG. 4, a block diagram of a system configured to rate privacy policies is shown and is generally designated 400. The system 400 may be an embodiment of the system 100 in FIG. 1, the system 200 in FIG. 2, or the system 300 in FIG. 3. The system 300 can include the PPAS 102, the network 106, the privacy policy source 204, and the privacy policy source 206. The system 300 can include a device 402, which may be a representative example of the user device 104. The device 402 may include an interface 404, which may be a wired interface or a wireless transceiver configured to communicate with various websites and with the PPAS 102 via the network 106. The device 402 may further include a processor 406 coupled to the interface 404 and coupled to a memory 408. Further, the processor 406 may be coupled to an input/output (I/O) interface 410, which may be a touch screen interface, a keypad, a keyboard, a display, or any combination thereof.

The memory 408 may store applications that may be executed by the processor 406. In some embodiments, the memory 408 may include a browser application 412, which may be executable by the processor 406 to produce an Internet browser window through which a user may interact with websites on the Internet. In some embodiments, the browser application 412 may have a built-in privacy application or a privacy policy plugin 414, which may be configured to determine and display a privacy policy score for each website. In some embodiments, the processor 406 may execute the browser application 412 to visit a website, and the browser application 412 may render the web page and provide the web page to the I/O interface 410. The browser application 412 may cause the processor 406 to render a webpage 416 including a menu bar or info bar. In some embodiments, the privacy policy plugin 414 may cause the processor 406 to display the privacy policy score 418 within the webpage 416. In some embodiments, the browser application 412 in conjunction with the built-in privacy application or the privacy policy plugin 414 may route traffic through a virtual private network (VPN) or a proxy server that is associated with the PPAS 102, allowing the PPAS 102 to determine the privacy policy score for each website and to provide the privacy policy score and the web page data to the device 402.

In some embodiments, when the device 402 communicates with a website using the browser application 412, the privacy policy plugin 414 can send URL data for the website to the PPAS 102 via the network 112. The PPAS 102 can provide the privacy policy score to the privacy policy plugin 314, which can display the privacy policy score 418 within the rendered web page 416 via the display interface 410. In some embodiments, the memory 408 may include a privacy policy application 420 that may retrieve a privacy policy score from the PPAS 102 and may provide the privacy policy score to the I/O interface 410.

The privacy policy score 418 may be customizable to display the score as a letter grade, such as in an academic format (e.g., A+, A, A−, B+, B, B−, C+, C, C−, . . . F), a star score format (e.g. one star, two stars, etc.), a color coded (e.g. green, yellow, blue, red etc.), a numeric scale, or another format. In some examples, the user can tap, click, double click, or otherwise select the privacy policy score 418 to access more information about the privacy policy, such as an explanation of why the website received the particular score, and so forth. In some embodiments, the privacy policy score 418 may be a clickable link or element that may be selected by the user to access the underlying information, which may be displayed in a popup window or a new browser window (or within an area associated with the score).

In some embodiments, the privacy policy plugin 414 may be configured to require confirmation from the user to continue to a website that has a privacy policy score that is below a threshold. In some embodiments, the privacy policy plugin 414 may restrict access to some websites having privacy policy sources having low privacy policy scores, and may be configured to restrict access to privacy policy sources specifically identified by the user. The size and location of the privacy policy score 418 within the rendered webpage 416 may be fixed or may be adjusted by the user.

In some embodiments, the privacy policy application 420 or the browser application 412 may provide a comprehensive privacy solution and may work for existing and/or built-in browsers, third-party browsers and user apps that access websites. Similar to a security application, if the privacy policy application 420 or the PPAS 102 (since the browser application 412 can be configured to proxy or otherwise direct all traffic through the PPAS 102) may monitor calls to websites, and if the website has a privacy policy that is below the user-configured threshold, the privacy policy application 420 or the PPAS 102 can operate to block the transmission and/or to alert the user.

In some embodiments, the privacy policy application 420 or the PPAS 102 may provide an alert or notification to the device 104 indicating the privacy policy score, and optionally indicating that the privacy policy score is below a threshold score level (e.g., a "safe" privacy policy score).

Figure 5:
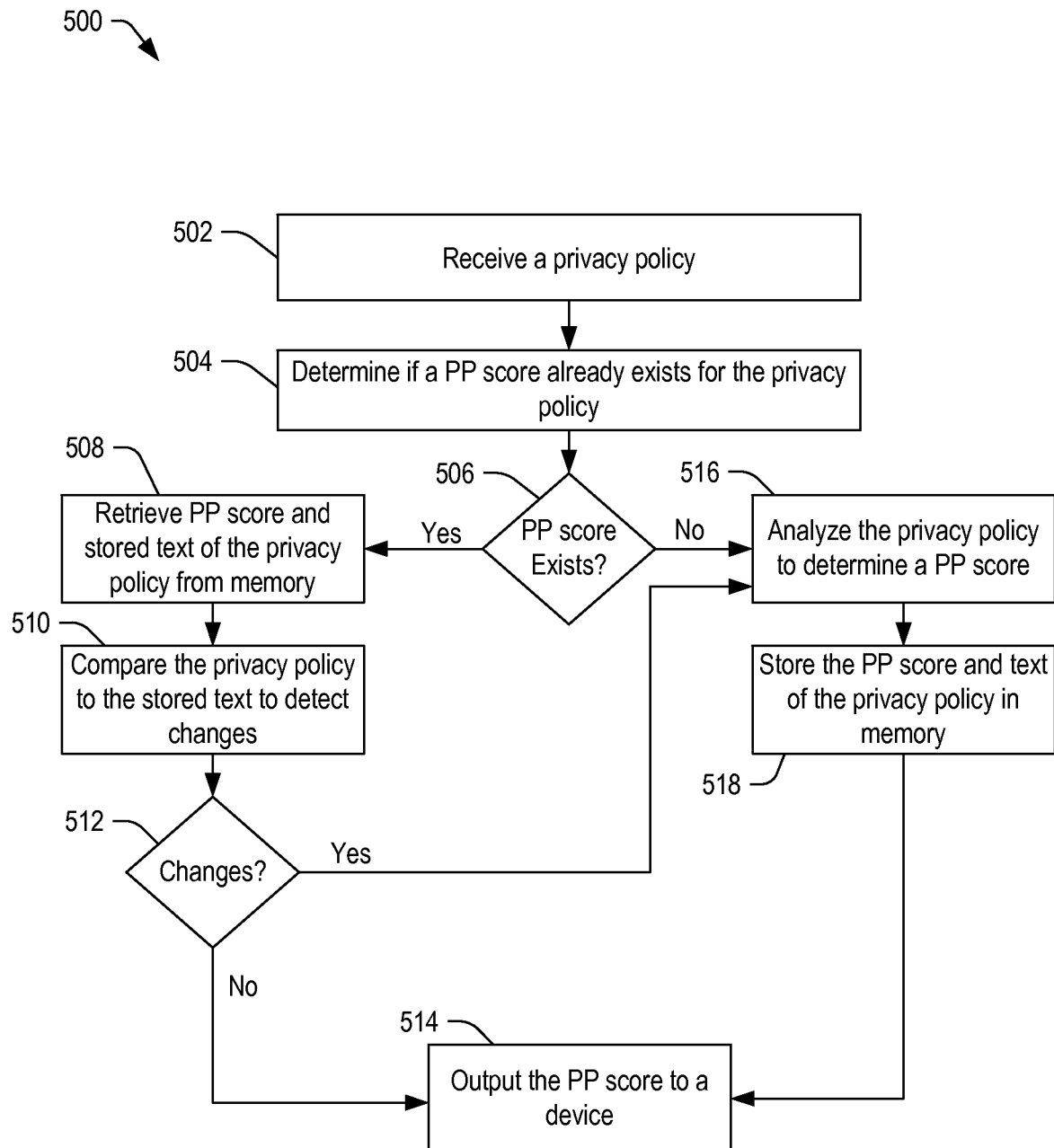
FIG. 5 is a flowchart of a method of providing a privacy policy rating according to some embodiments.

Referring to FIG. 5, a flowchart of a method of providing a privacy policy score is shown and is generally designated 500. The method 500 can include receiving a privacy policy, at 502. The privacy policy may be received from a privacy policy source, retrieved from a database or a source, or received from a device 104. Advancing to 504, the method 500 may include determining if a privacy policy score already exists for the privacy policy. In some embodiments, the PPAS 102 may search a privacy policy database 216 to determine if a score already exists.

Continuing to 506, if a privacy policy score exists, the method 500 may include retrieving the privacy policy score and stored text of the privacy policy from memory. In some embodiments, the score and text may be retrieved from the privacy policy database 216. Moving to 510, the method 500 compares the privacy policy to the stored text to detect changes. Continuing to 512, if there is no difference or change, the method 500 may include outputting the privacy policy score to a device, at 514.

Returning to 506, if no privacy policy score exists, the method may include analyzing the privacy policy to determine a privacy policy score, at 516. The PPAS 102 may analyze the text of the privacy policy semantically. In some embodiments, the PPAS 102 may compare the text to pre-scored text to determine scores for portions of the privacy policy text.

The method 500 may include storing the privacy policy score and text of the privacy policy in memory, at 518. In some embodiments, the privacy policy score and text may be stored in the privacy policy database 216. Further, the method 500 may include outputting the privacy policy score to a device, at 514.

Returning to 512, if the privacy policy score already exists but there have been changes to the privacy policy since the privacy policy score was determined, the method 500 may include analyzing the privacy policy to determine a privacy policy score, at 516. The method 500 may further include storing the privacy policy score and text of the privacy policy in memory, at 518, and outputting the privacy policy score to a device, at 514.

Figure 6:
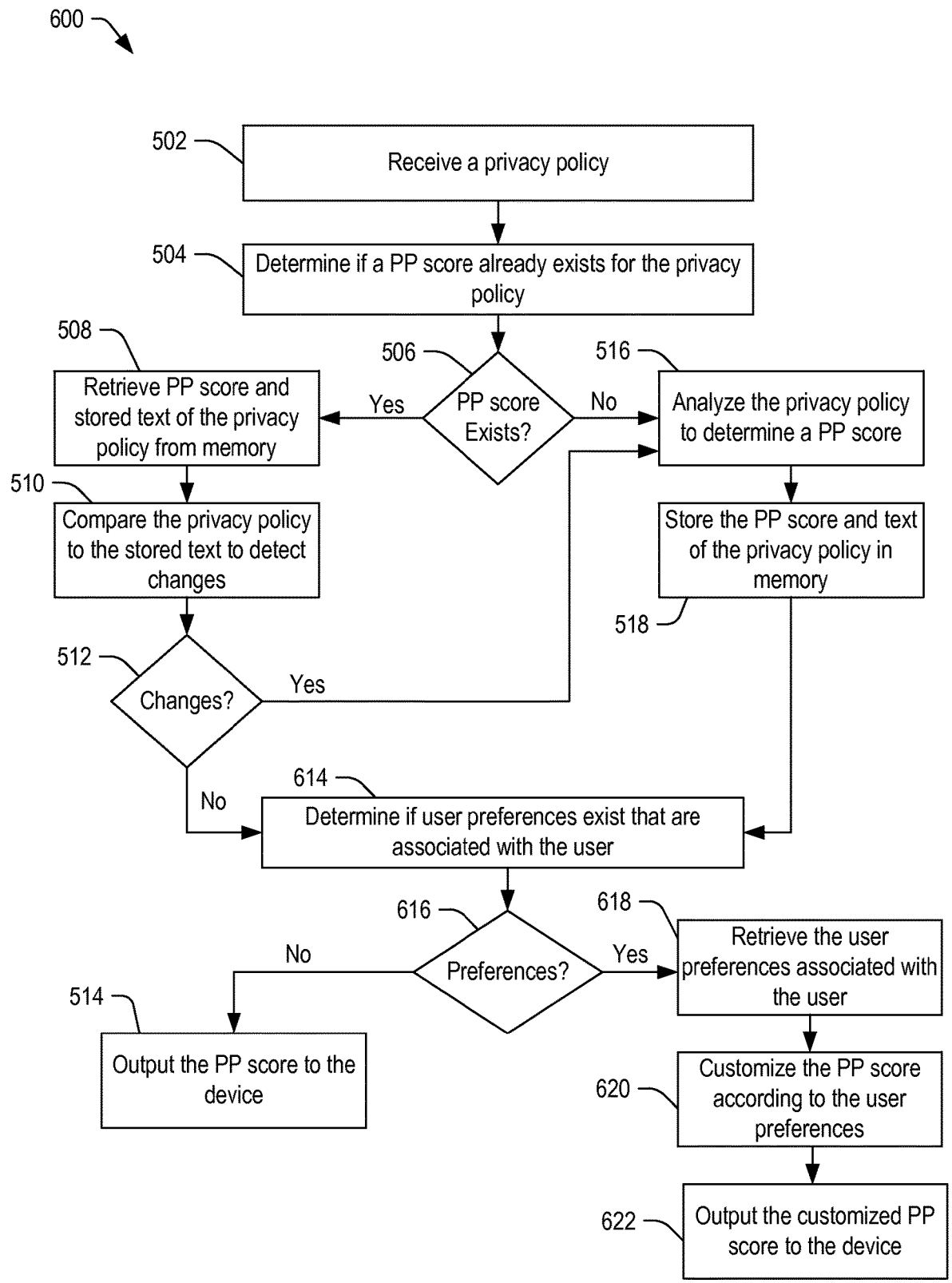
FIG. 6 is a flowchart of a method of providing a privacy policy rating according to some embodiments.

Referring to FIG. 6, a flowchart of a method of score privacy policies is shown and is generally designated 600. The method 600 includes the method 500 with additional method elements. If there are no changes to the previously scored privacy policy at 512 or once the privacy policy score is determined and stored at 516 and 518, the method 600 may include determining if user preferences exist that are associated with the user, at 614.

The method 600 may include determining if user preferences exist that are associated with the user, at 616. If no user preferences exist at 616, the method 600 may include outputting the PP score to the device, at 514. Returning to 616, if user preferences exist, the method may include retrieving the user preferences associated with the user, at 618. The method 600 may further include customizing the privacy policy score according to the user preferences, at 620. The method 600 may also include outputting the customized privacy policy score to the device, at 622.

In conjunction with the systems, devices, and methods described above with respect to FIGS. 1-6, the systems may determine a privacy policy score for an application or a website and may provide the privacy policy score to a requesting device. It should be appreciated that some of the elements in FIGS. 5 and 6 may be combined or omitted without departing from the scope of the disclosure.

Further, in the above-discussion, various inputs and interfaces have been mentioned. It should be appreciated that web pages may be rendered within an Internet browser application to provide a form or other input interface through which a user may enter information. Some examples of graphical user interfaces are described below with respect to FIGS. 7-10.

Figure 7:
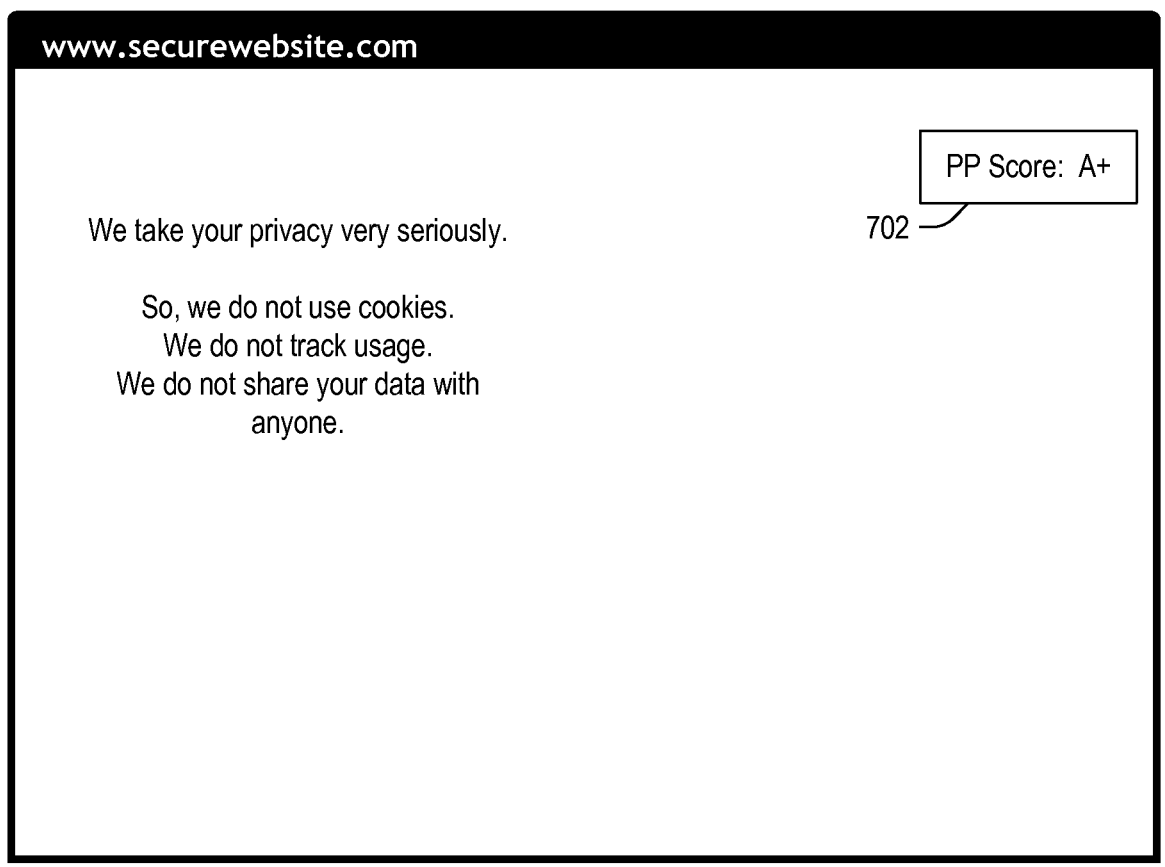
FIG. 7 is a diagram of a graphical user interface to provide a privacy policy rating according to some embodiments.

FIG. 7 is a diagram of a graphical user interface 700 to provide a privacy policy rating according to some embodiments. The graphical user interface 700 may be an example of a web page 416 within which a privacy policy score 418 may be displayed. The graphical user interface 700 may include a privacy policy score object 702, which is depicted as a box including the privacy policy score.

In some examples, the privacy policy score object 702 may be included within the browser menu. In some embodiments, the privacy policy score object 702 may be a closeable popup window, a color-coded object, or some other indicator of the relative strength of the privacy policy for the particular site. In some embodiments, the user may move, resize, or otherwise alter the presentation of the privacy policy score object 702. In some embodiments, the privacy policy score object 702 may be user-selectable. User interaction with the privacy policy score object 702 may cause the graphical user interface 700 to display information including details related to the determination of the privacy policy score.

Figure 8:
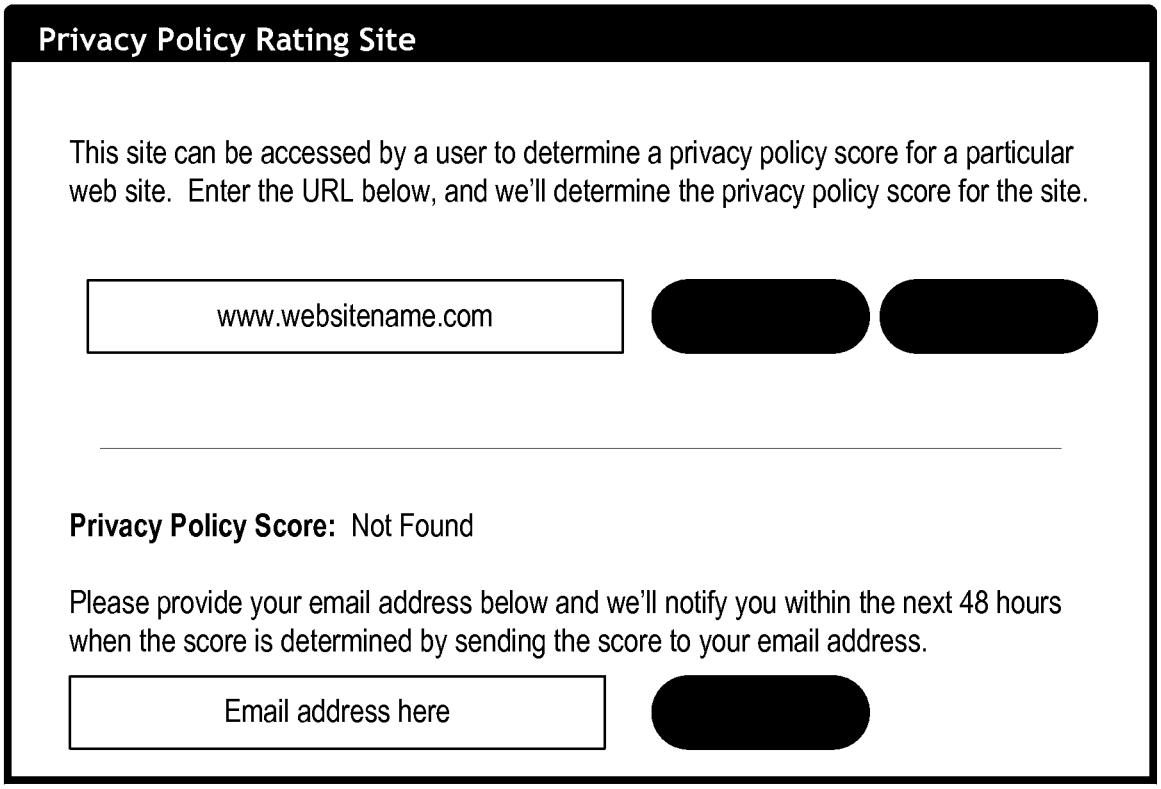
FIG. 8 is a diagram of a graphical user interface to request a privacy policy rating according to some embodiments.

FIG. 8 is a diagram of a graphical user interface 800 to request a privacy policy rating according to some embodiments. The graphical user interface 800 may include user-selectable elements such as buttons and input fields with which a user may interact to enter a website address (URL) and to either clear the input or to initiate the privacy policy scoring (rating) process. In the illustrated example, the requested URL does not have an existing privacy policy score, so the graphical user interface 800 includes an input for receiving the user's email address. Upon submission of the user's email address, the system may be authorized to send an alert to the user's email address once the privacy policy score for the URL is determined.

In some embodiments, the graphical user interface 800 may be presented as a web page. In some embodiments, the graphical user interface 800 may be presented within a privacy policy application executing on a device.

FIG. 9 is a diagram of a graphical user interface 900 to request a privacy policy rating according to some embodiments. The graphical user interface 900 may include user-selectable elements such as buttons and input fields with which a user may interact to enter a website address (URL) and to either clear the input or to initiate the privacy policy scoring (rating) process. In the illustrated example, the requested URL does have an existing privacy policy score, so the graphical user interface 900 includes the privacy policy score, which may be selectable by the user to access additional information about the score, such as the rationale for the privacy policy score.

FIG. 10 is a diagram of a graphical user interface 1000 accessible by a user to configure user preferences related to privacy policies according to some embodiments. The graphical user interface 1000 may provide a user preferences interface through which a user may interact to configure the relative importance of various privacy policy elements. In the illustrated example, the user may select between user information collection aspects, cookies and tracking aspects, data sharing aspects, review aspects, other aspects, or any combination thereof. The various aspects may be accessible via tabs. Further, the user may interact with pull down menus or other selectable elements (such as text inputs, check boxes, radio buttons, etc.) to rate the relative importance of various aspects of the privacy policy. In some embodiments, the user may rate the relative level of concern (privacy concern) with respect to various information items associated with collection of information about the user. Selection of other tabs may result in different information items and the same or different user-selectable elements.

In conjunction with the systems, methods, and graphical user interfaces described above with respect to FIGS. 1-10, a system may receive a signal from a device and may provide a privacy policy score to the device in response to the signal. The system may process a privacy policy (automatically, using human interaction, or any combination thereof) to produce the privacy policy score. The system may also detect changes in the privacy policy and may update the privacy policy score periodically or in response to a request. In some embodiments, the system may provide privacy policy scores for websites and application.

While the above-discussion has focused on websites and applications that may access the Internet, the system may be configured to perform a privacy policy analysis on privacy policy documents. In some embodiments, a graphical user interface may be provided through which a user may upload a document including the privacy policy. In response to receiving the document, the system may perform optical character recognition on the document and may perform a privacy policy analysis on the text to determine a privacy policy score, which may be emailed, texted, or otherwise communicated to the requester.

The processes, machines, and manufactures (and improvements thereof) described herein are particularly useful improvements for computers using privacy policy score systems and methods. Further, the embodiments and examples herein provide improvements in the technology of privacy policy score systems. In addition, embodiments and examples herein provide improvements to the functioning of a computer by privacy policy scores for visited websites (either before or after the user visits the site) and by selectively blocking access to websites that have a privacy policy score that is below a user-defined threshold, thereby creating a specific purpose computer by adding such technology. Thus, the improvements herein provide for technical advantages, such as providing a system in which a user's interaction with a computer system and various websites enjoys enhanced protection in terms of protecting a user's privacy and the sharing of information about the user. For example, the systems and methods described herein can be particularly useful to any systems in which a user may visit an unknown website that attempts to determine information about the user, such as by assigning cookies to the user's browser during the session and by collecting information about the user. While technical fields, descriptions, improvements, and advantages are discussed herein, these are not exhaustive and the embodiments and examples provided herein can apply to other technical fields, can provide further technical advantages, can provide for improvements to other technologies, and can provide other benefits to technology. Further, each of the embodiments and examples may include any one or more improvements, benefits and advantages presented herein.

The illustrations, examples, and embodiments described herein are intended to provide a general understanding of the structure of various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, in the flow diagrams presented above, in some embodiments, blocks may be removed or combined without departing from the scope of the disclosure. Further, structural and functional elements within the diagram may be combined, in some embodiments, without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above examples, and other embodiments not specifically described herein, will be apparent to those of skill in the art upon reviewing the description. Additionally, the illustrations are merely representational and may not be drawn to scale. Some proportions within the illustrations may be exaggerated, while other proportions may be reduced. Accordingly, the disclosure and the figures are to be regarded as illustrative and not restrictive.

What is claimed is:

1. A system comprising:
   a processor;
   a memory accessible to the processor and storing instructions that, when executed by the processor, cause the processor to perform operations including:
   automatically determining, at a privacy policy analysis system (PPAS), a privacy policy score for a website based on an automatic semantic analysis of text of a privacy policy associated with the website;
   receiving at the PPAS, from a user at a user device, user preferences that reflect a relative importance of at least one of one or more privacy policy characteristics to that user;
   customizing, at the PPAS, the privacy policy score based on the user preferences of that user;
   determining, at the PPAS, that the privacy policy score is below a threshold value;
   blocking, at the user device, access to the website based on the privacy policy score falling below the threshold value;
   detecting, at the PPAS, a change in the text of the privacy policy associated with the website after the privacy policy score is determined;
   automatically determining, at the PPAS, an updated privacy policy score based on the change in the text of the privacy policy;
   customizing, at the PPAS, the updated privacy policy score based on the user preferences of the user;
   determining, at the PPAS, that the updated privacy policy score is not below the threshold value; and
   unblocking, at the user device, access to the website based on the updated privacy policy score not being below the threshold value.

2. The system of claim 1, further comprising instructions that cause the processor to perform operations including:
   surveying a plurality of users for receiving, at the PPAS from the plurality of users, user preferences reflecting a relative importance of at least one of the one or more privacy policy characteristics to the plurality of users.

3. The system of claim 2, wherein the user preferences received from the plurality of users are combined to produce a weighting factor for the one or more privacy policy characteristics, and wherein the weighting factor is used in determining the privacy policy score.

4. The system of claim 1, further comprising instructions that cause the processor to perform operations including:
   providing, at the PPAS, the privacy policy score to a privacy policy plugin associated with an Internet browser application executing on the user device.

5. The system of claim 4, wherein blocking access to the website includes the privacy policy plugin blocking access to the website.

6. The system of claim 1, wherein determining the privacy policy score for the website includes retrieving the privacy policy score from a database.

7. The system of claim 1, wherein the detecting the change in the text of the privacy policy includes comparing the privacy policy with a stored privacy policy.

8. A computer-program product tangibly embodied in a non-transitory machine-readable storage medium of a gateway device, including instructions configured to cause one or more data processors to perform operations including:
   automatically determining, at a privacy policy analysis system (PPAS), a privacy policy score for a website based on an automatic semantic analysis of text of a privacy policy associated with the website;
   receiving at the PPAS, from a user at a user device, user preferences that reflect a relative importance of at least one of one or more privacy policy characteristics to that user;
   customizing, at the PPAS, the privacy policy score based on the user preferences of that user;
   determining, at the PPAS, that the privacy policy score is below a threshold value;
   blocking, at the user device, access to the website based on the privacy policy score falling below the threshold value;
   detecting, at the PPAS, a change in the text of the privacy policy associated with the web site after the privacy policy score is determined;
   automatically determining, at the PPAS, an updated privacy policy score based on the change in the text of the privacy policy;
   customizing, at the PPAS, the updated privacy policy score based on the user preferences of the user;
   determining, at the PPAS, that the updated privacy policy score is not below the threshold value; and
   unblocking, at the user device, access to the website based on the updated privacy policy score not being below the threshold value.

9. The computer-program product of claim 8, further comprising instructions configured to cause one or more data processors to perform operations including:
   surveying a plurality of users for receiving, at the PPAS from the plurality of users, user preferences reflecting the relative importance of at least one of the one or more privacy policy characteristics to the plurality of users.

10. The computer-program product of claim 9, wherein the user preferences received from the plurality of users are combined to produce a weighting factor for the one or more privacy policy characteristics, and wherein the weighting factor is used in determining the privacy policy score.

11. The computer-program product of claim 8, further comprising instructions configured to cause one or more data processors to perform operations including:
    providing, at the PPAS, the privacy policy score to a privacy policy plugin associated with an Internet browser application executing on the user device.

12. The computer-program product of claim 11, wherein blocking access to the website includes the privacy policy plugin blocking access to the website.

13. The computer-program product of claim 8, wherein determining the privacy policy score for the website includes retrieving the privacy policy score from a database.

14. The computer-program product of claim 8, wherein the detecting the change in the text of the privacy policy includes comparing the privacy policy with a stored privacy policy.

15. A computer-implemented method, comprising:
    automatically determining, at a privacy policy analysis system (PPAS), a privacy policy score for a website based on an automatic semantic analysis of text of a privacy policy associated with the website;
    receiving at the PPAS, from a user at a user device, user preferences that reflect a relative importance of at least one of one or more privacy policy characteristics to that user;

customizing, at the PPAS, the privacy policy score based on the user preferences of that user;

determining, at the PPAS, that the privacy policy score is below a threshold value;

blocking, at the user device, access to the website based on the privacy policy score falling below the threshold value;

detecting, at the PPAS, a change in the text of the privacy policy associated with the website after the privacy policy score is determined;

automatically determining, at the PPAS, an updated privacy policy score based on the change in the text of the privacy policy;

customizing, at the PPAS, the updated privacy policy score based on the user preferences of the user;

determining, at the PPAS, that the updated privacy policy score is not below the threshold value; and unblocking, at the user device, access to the website based on the updated privacy policy score not being below the threshold value.

16. The computer-implemented method of claim 15, further comprising:

surveying a plurality of users for receiving, at the PPAS from the plurality of users, user preferences reflecting a relative importance of at least one of the one or more privacy policy characteristics to the plurality of users.

17. The computer-implemented method of claim 16, wherein the user preferences received from the plurality of users are combined to produce a weighting factor for the one or more privacy policy characteristics, and wherein the weighting factor is used in determining the privacy policy score.

18. The computer-implemented method of claim 15, further comprising:

providing, at the PPAS, the privacy policy score to a privacy policy plugin associated with an Internet browser application executing on the user device.

19. The computer-implemented method of claim 18, wherein blocking access to the website includes the privacy policy plugin blocking access to the website.

20. The computer-implemented method of claim 15, wherein the detecting the change in the text of the privacy policy includes comparing the privacy policy with a stored privacy policy.

* * * * *